Figure 1:
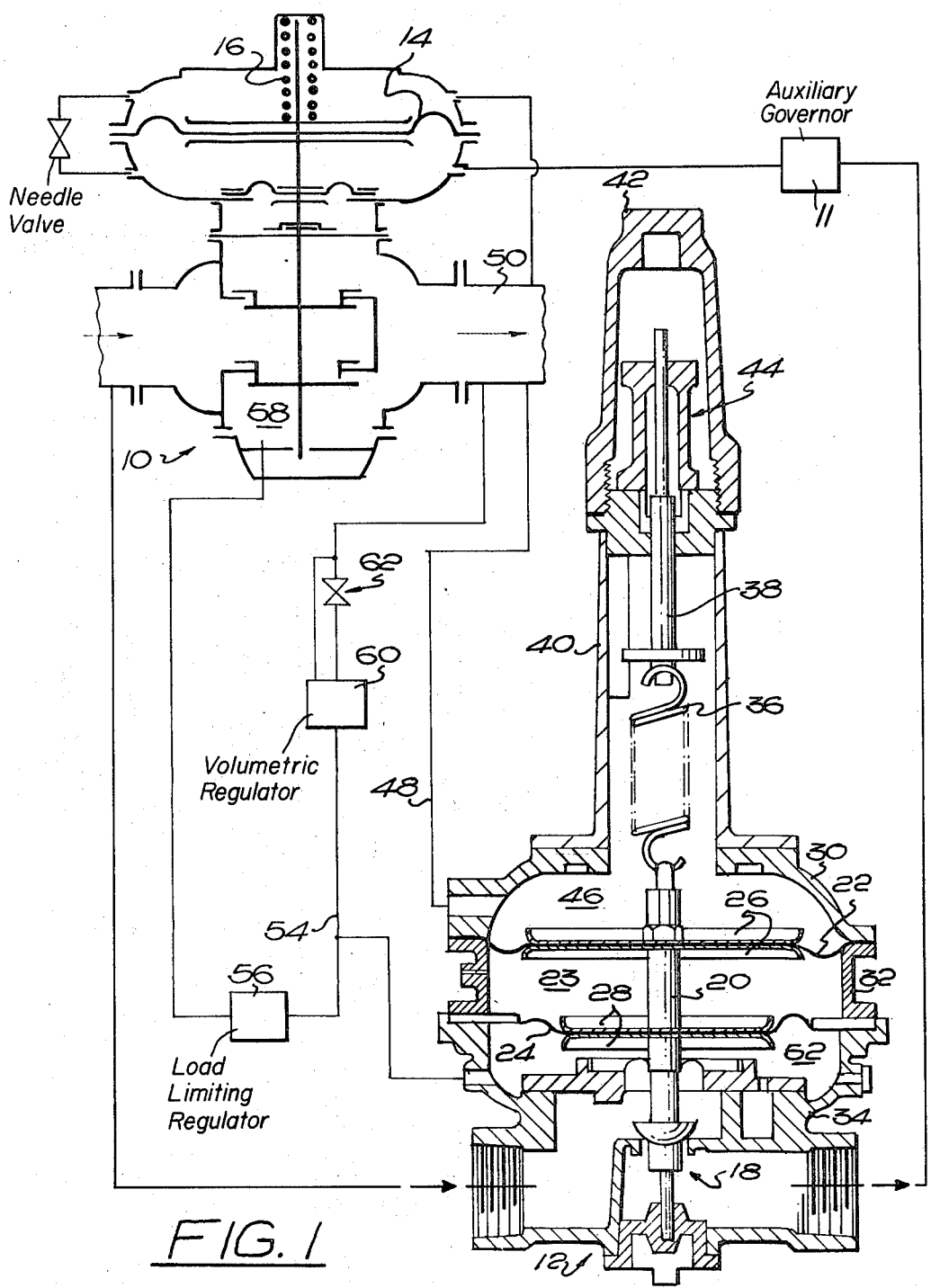

United States Patent [19]
Doe

[11] 3,807,439
[45] Apr. 30, 1974

[54] GAS SUPPLY APPARATUS
[75] Inventor: Ernest Edward Doe, Chesterfield, England
[73] Assignee: The Bryan Donkin Company Limited, Chesterfield, Derbyshire, England
[22] Filed: Nov. 22, 1972
[21] Appl. No.: 308,794

[30] Foreign Application Priority Data
Dec. 2, 1971 Great Britain.................... 56052/71

[52] U.S. Cl. ............................................ 137/489.5
[51] Int. Cl. ........................................ G05d 16/06
[58] Field of Search ........ 137/488, 489, 489.5, 492, 137/492.5, 12

[56] References Cited
UNITED STATES PATENTS
2,273,111  2/1942  Kindl .............................. 137/489.5
2,837,241  6/1958  Griswold ........................ 137/489 X
2,257,171  9/1941  King ............................... 137/489.5
2,340,954  2/1944  Garretson ...................... 137/489 X Primary Examiner—Henry T. Klinksiek
Assistant Examiner—Robert J. Miller
Attorney, Agent, or Firm—Browdy and Neimark

[57] ABSTRACT

A method of and apparatus for controlling the supply of gas to a gas main in such a way that the apparatus remains pressure responsive throughout its range of operation but so that the controlled pressure of gas supplied varies steplessly in accordance with actual demand.

5 Claims, 4 Drawing Figures

GAS SUPPLY APPARATUS

The invention relates to gas supply control apparatus and has for its object to provide an improvement therein.

The supply of gas to a gas main is usually controlled by a governor valve responsive to pressure in the main, and whilst this is quite satisfactory during periods of normal demand, and where the main being supplied is relatively short, during periods of heavy demand and consequent greater rates of flow the consumers farthest away from the source of supply suffer a loss of pressure due to gradual pressure losses along the length of the main (the pressure loss varying of course according to the square of the rate of flow). The problem is most acute where the main is relatively long.

This problem cannot always simply be solved by increasing the pressure of gas at the input end of the main for various reasons. Firstly, the maximum supply pressure of gas in the mains is limited by law for reasons of safety. Secondly, it is desirable to keep supply pressures as low as possible to reduce as much as possible the amount of gas which is "unaccounted for" by reason of leakage. Since natural gas is relatively dry and very searching the leakage problem is becoming more acute and it is becoming even more necessary to keep supply pressure as low as possible.

Various attempts have been made to find a complete answer to this problem but none have been entirely satisfactory. The most usual system employed involves the use of timers which cause the supply pressures to be raised at certain times of the day when peak loads may be expected. Another system has involved the use of two or more pilot regulators used selectively according to gas demand but this has been a mere palliative and cannot be expected to control the supply pressure ideally under all conditions. Other systems requiring complicated and expensive instrumentation have been used. Relatively simple systems are generally unstable, being directly responsive to flow changes including those due to compression of gas in the main (line packing).

According to one aspect of the invention, there is provided a method of controlling the supply pressure of gas supplied to a gas main, the method including the steps of controlling the opening of a pilot governor in accordance with the pressure in the upstream end of the gas main and secondarily, steplessly modifying the actuation of the pilot governor according to the demand for gas so that an increase in pressure dictated by demand will substantially equal pressure loss due to gas flow along the main.

According to another aspect of the invention, there is provided a gas supply pressure control apparatus including a pilot governor provided with means whereby it can be acted upon by gas pressure at an upstream end of a gas main, to be responsive to changes of such pressure, and with further means whereby it can be secondarily acted upon by a pressure varying according to the rate of flow of gas along the gas main, the arrangement being such that the actuation of said pilot governor in response to pressure changes at the upstream end of said gas main is modified in accordance with the demand for gas so that an increase in pressure dictated by demand will substantially equal pressure loss due to gas flow along the main. The pilot governor valve will preferably include a primary controlling diaphragm and a secondary controlling diaphragm of predeterminedly smaller effective area than said primary diaphragm. The pilot governor valve may also be associated with a load limiting regulator for limiting the maximum gas pressure dictated by demand and with a volumetric regulator and a needle valve for adjusting the basic or minimum gas supply pressure (at low flow). On the other hand, the secondary controlling diaphragm of the pilot governor valve may be connected to the valve member of the valve through a spring, and a further spring provided to act against said diaphragm so that only a proportion of the gas pressure acting against said secondary controlling diaphragm acts against the valve member, depending on the force of said further spring. In this case an adjusting nut will preferably be provided whereby the force of said further spring can be adjusted. The pilot governor valve will preferably be provided with a limiting screw, the adjustment of which is effective to limit the opening of the valve.

According to yet a further aspect of the invention, there is provided, in combination, at least one main governor valve for controlling gas flow to a gas main, a pilot governor and auxiliary system whereby the opening and closing of said main governor follows the opening and closing of the pilot governor, and means within said pilot governor whereby it can be acted upon by gas pressure at an upstream end of the gas main to be directly responsive to changes of such pressure, and with further means whereby it can also be acted upon by a pressure varying according to the rate of flow of gas along the gas main, the arrangement being such that the actuation of said pilot governor (and thus of said main governor) in response to pressure changes at the upstream end of the gas main is modified in accordance with the demand for gas so that an increase in pressure dictated by demand will substantially equal pressure loss due to gas flow along the main.

Figure 2:
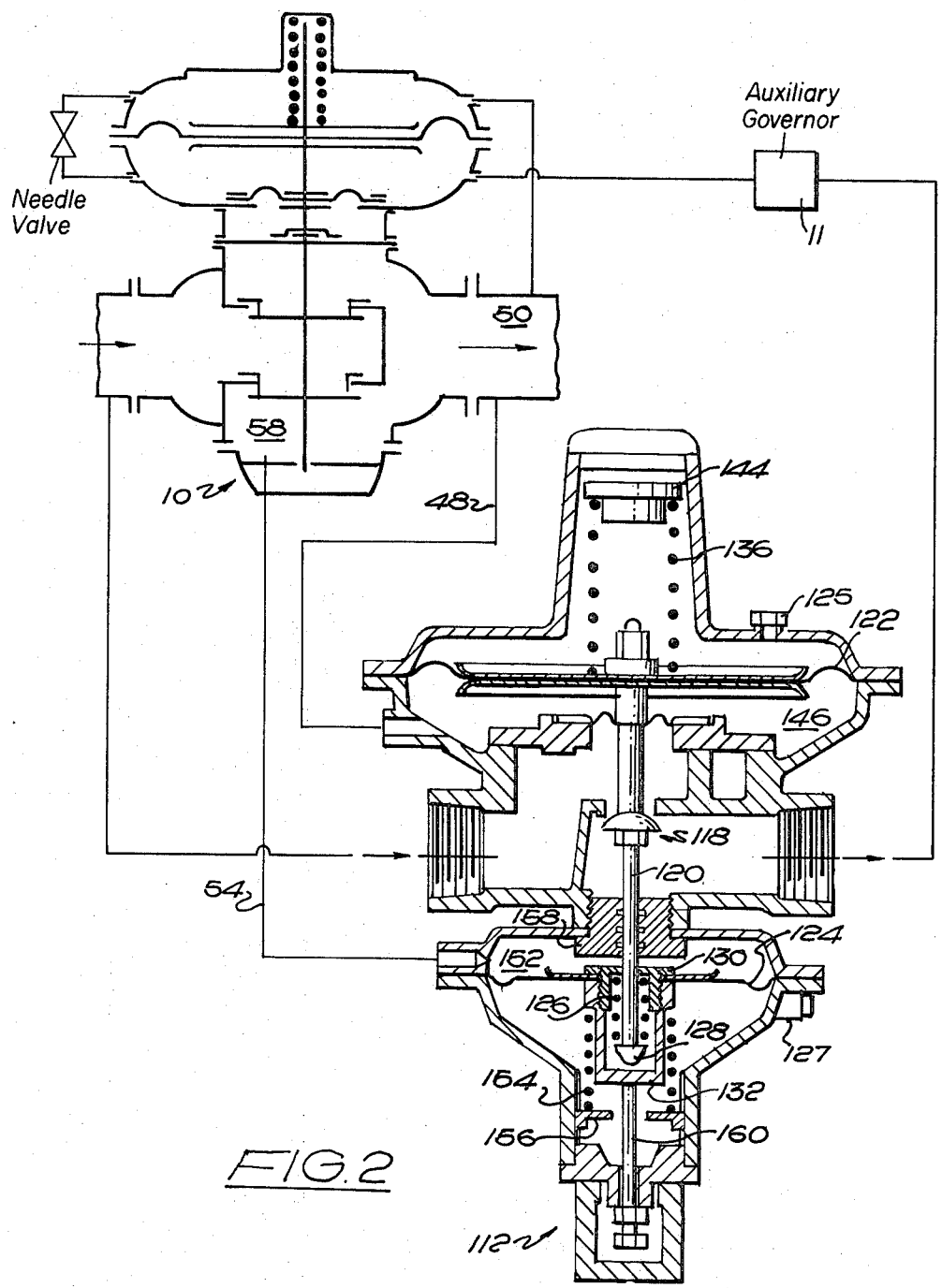
Figure 3:
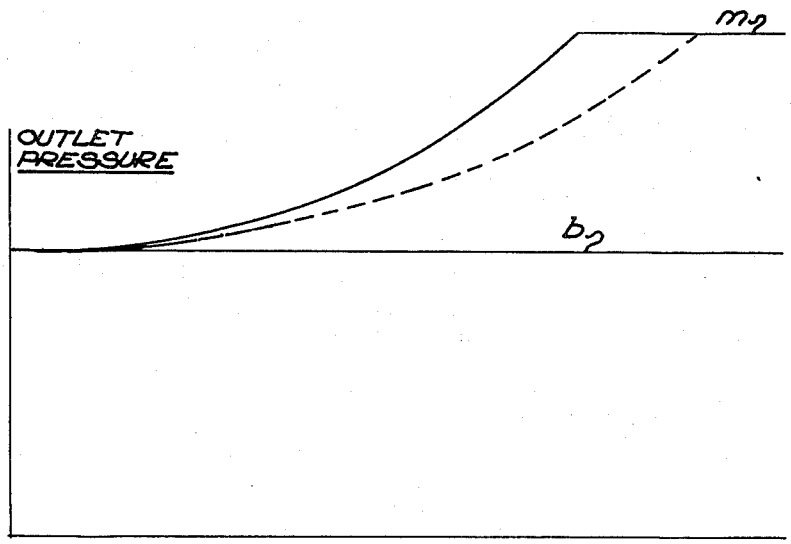
Figure 4:
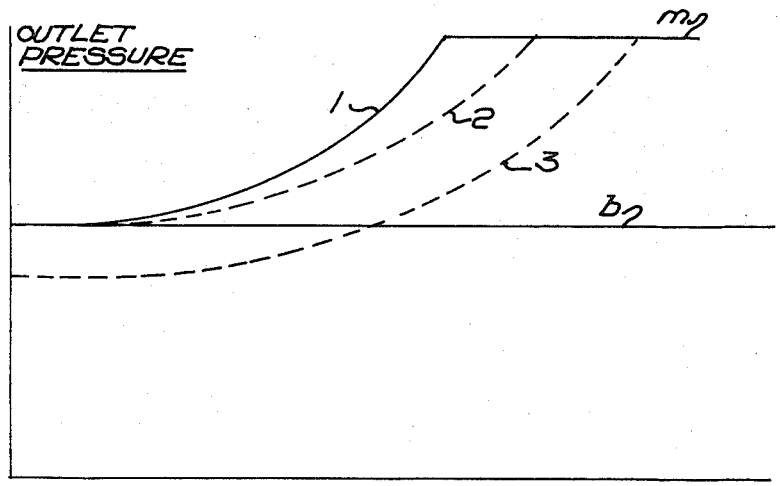

In order that the invention may be fully understood and readily carried into effect, the same will now be described, by way of example only, with reference to the accompanying drawings, of which:

FIG. 1 is a diagrammatic illustration of gas supply pressure control apparatus embodying the invention, FIG. 2 is a diagrammatic illustration of a modified form of such apparatus, and FIGS. 3 and 4 are graphs which illustrate the manner in which the apparatus of FIGS. 1 and 2 respectively can be used to modify the actuation of the main governor in response to pressure changes at the upstream end of the gas main.

Referring now to FIG. 1 of the drawing, the gas supply pressure control apparatus there illustrated includes a main governor valve generally indicated 10 and a pilot governor 12. A conventional auxiliary system 11 is provided whereby the opening and closing of the main governor follows the opening and closing of the pilot governor, that is to say controlled by it, and the system need not be described in detail save to say that the pressure of gas acting on the control diaphragm 14 of the main governor (which is of the pressure balanced type) in opposition to the force of a spring 16 varies in accordance with the volume of gas flowing through the pilot governor under the control of valve 18.

The pilot governor is provided with a spindle 20 which carries the closure member of valve 18 at its lower end. Said spindle also carries a pair of flexible diaphragms, a primary controlling diaphragm 22 near its upper end and a secondary loading diaphragm 24 intermediate its ends, said diaphragms being clamped between respective pairs of discs 26 and 28. The peripheries of the diaphragms are clamped between separate sections of the body of the pilot governor, that of the primary controlling diaphragm being clamped between an upper part 30 and an intermediate part 32 and that of the secondary loading diaphragm being clamped between said intermediate part and a lower part 34 of the body. The space 23 between the diaphragms is vented to atmosphere. It will be seen however that the effective area of the secondary loading diaphragm is somewhat less than that of the primary controlling diaphragm. A coiled tension spring 36 connects an upper end of the spindle 20 to an anchorage 38 within an upstanding housing 40. A removable cap 42 is provided on the housing and when removed gives access to screwthreaded adjustment means generally indicated 44 by means of which the tension of the spring can be adjusted.

The space 46 overlying the primary controlling diaphragm is connected by way of a conduit 48 to a gas main 50 on the outlet side of the main governor. The space 52 immediately below the secondary loading diaphragm on the other hand is connected into a conduit 54 which communicates by way of a load limiting regulator 56 with a space 58 within the main governor (on the outlet side of its closure member). The conduit 54 also communicates with a point in the gas main 50 by way of a volumetric regulator 60 and a needle valve 62. The space 52 communicates with the conduit 54 at a point between the load limiting regulator and the volumetric regulator.

It is found that flow of gas through the main regulator produces a pressure differential between the space 58 and the gas main 50 into which the gas is discharged, the pressure differential varying according to the velocity of flow, even though these are immediately adjacent each other. Consequently it is found that although the pilot governor at zero flow is controlled only according to pressure in the gas main 50, and in fact throughout its range of operation remains directly responsive to changes of pressure in the main, at substantial rates of gas flow there is produced a pressure of gas in the space 52 somewhat higher than that acting in the space 46. This increased pressure cannot of course take over the control of the pilot governor because of the difference in effective area between the diaphragms 22 and 24, but it does modify the actuation of the governor under the control of the pressure responsive diaphragm 22, and in fact can be considered as varying the tension of the spring 36 according to the demand for gas. The basic or minimum pressure can of course be adjusted at zero flow by the screwthreaded adjustment means 44 and any variations from this will be an increase of pressure dictated by actual demand, that is to say, to overcome pressure loss due to gas flow along the main. The extent to which the opening of the valve 18 is modified, at any particular pressure, in response to gas flow through the main can be adjusted by adjustments of the needle valve 62, the presence of which prevents gas being trapped in the space 52 and allows the pressure in said space to be reduced relative to that in the space 58. The maximum pressure setting on the other hand is determined by the adjustment of the load limiting regulator 56.

The manner in which the apparatus can be used to modify the actuation of the pilot goveror (and thus of the main governor) is illustrated in FIG. 3 where rates of flow in cubic feet of gas per minute are plotted against outlet pressures in lbs. per. square inch. The basic or minimum pressure, determined by the setting of the adjustment means 44, is indicated by the line $b$ whilst the maximum pressure, determined by the adjustment of the load limiting regulator 56, is indicated by the line $m$. The slope of the curve between the lines $b$ and $m$, that is to say the extent to which the opening of the valve 18 is modified at any particular pressure in response to gas flow through the main, is determined by the setting of the needle valve 62.

The required difference between the effective areas of the diaphragms 22 and 24 can of course be determined by trial and experiment but it may conveniently be arranged that an increase in the loading pressure acting beneath diaphragm 24 will be equal to and balance an increase of pressure on diaphragm 22 of, say, 40 percent of the increase in loading pressure.

Thus there is provided a gas supply pressure control apparatus which is of a particularly simple and reliable construction and which by virtue of its mode of operation has been found to be very stable over a very wide range of operating conditions, that is to say, from zero flow to maximum rates of flow, the controlled pressure of gas supplied by the apparatus varying steplessly in accordance with actual demand. It has been found that, whilst remaining pressure responsive, the apparatus is capable of controlling the pressure of gas supplied in accordance with actual demand so that consumers farthest away from the source of supply do not suffer a serious loss of pressure during peak periods and so that no excess pressure above what is actually required is ever maintained in the supply main. Consequently, leakages and "unaccounted for" losses are reduced to a minimum.

Referring now to FIG. 2, in a modified form of the apparatus the operation of the pilot governor 12, the load limiting regulator 56 and the volumetric regulator 60 and needle valve 62 have been incorporated in a modified form of pilot valve generally indicated 112.

The pilot valve 112 includes a spindle 120 which carries the closure member of valve 118 the opening and closing of which causes the opening and closing of the main governor valve 10. An upper end of said spindle carries a primary controlling diaphragm 122 and a lower end of said spindle is connected to a secondary loading diaphragm 124. The primary controlling diaphragm 122 is fixed to the spindle and is acted on by a pressure of gas in a space 146 beneath it, this space communicating with the gas main 50 by way of the conduit 48. A coil compression spring 136 acts downwardly on the diaphragm 122 and reacts against an adjustment screw 144 which can be used to vary the force of the spring. The space 123 above the diaphragm 122 is vented to atmosphere through a vent plug 125. The lower end of the spindle on the other hand is connected to the secondary loading diaphragm 124 solely by a coil compression spring 126 which acts against a head 128 formed on said spindle and reacts against an annular clamping ring 130 which secures the diaphragm 124 to a depending abutment member 132. A space 152 which overlies the diaphragm 124 communicates with the space 58 within the main governor valve by way of the conduit 54. The space beneath the diaphragm 124 is vented to atmosphere through a vent plug 127.

As in the previously described embodiment, the primary controlling diaphragm has an area greater than that of the secondary loading diaphragm so that at relatively low demand, when the pressures in the spaces 146 and 152 are substantially the same, the force acting upwardly against the spring 136 controls the valve 118 solely in response to pressure in the main. The basic pressure is therefore determined by the adjustment of the screw 144. As demand increases however, the pressure in the space 152 exceeds the pressure in the space 146 in proportion to the rate of flow through the main governor. The control of the valve 118 is therefore modified according to this pressure differential and as in the previously described embodiment this can be likened to the force of the spring 136 being varied according to demand.

A downward force on the diaphragm 124 produced by a pressure of gas in the space 152 is opposed by the force of the spring 126 and by the force of a further coil compression spring 154 which acts against the abutment member 132 and reacts against an adjusting nut 156. Consequently, the proportion of the force acting downwards on the diaphragm 124 and acting against the spindle 120 is dependent on the setting of the spring 154 (and it will be understood that if the pre-compression of the spring 154 is such that the clamping ring 130 initially abuts hard against a gland nut 158, which divides the space 152 from the space within which the valve 118 is disposed, the diaphragm 124 will not be downwardly displaced to load the valve spindle with a load proportional to the demand for gas until the force of the spring 154 has been overcome, that is to say until there is a pre-determined gas pressure differential tending to open it resulting from a pre-determined minimum flow of gas through the main governor valve).

The maximum downward displacement of the abutment member 132 is determined by the setting of a limiting screw 160. Consequently, the setting of the limiting screw determines the maximum load which can be applied to the spindle by the spring 126 (regardless of the gas pressure in the space 152) and the maximum outlet pressure which the apparatus can bring about.

As previously explained, the pilot governor is controlled at zero flow solely in accordance with pressure in the gas main 50 and throughout its range of operation remains directly responsive to changes of pressure in the main. However, at substantial rates of gas flow there is produced a pressure of gas in the space 152 somewhat higher than that acting in the space 146. As in the previously described embodiment, the increased pressure cannot take over the control of the pilot governor because of the difference in effective areas of the diaphragm 122 and 124, but it does modify the actuation of the governor valve under the control of the pressure responsive diaphragm 122. This is shown in FIG. 4 where as in FIG. 3 the basic or minimum pressure determined by the setting of the adjustment means 144 is indicated by the line b and the maximum pressure, determined by the adjustment of the limiting screw 160, is indicated by the line m. The slope of the full line curve 1 between the lines b and m, that is to say the extent to which the opening of the valve 118 is modified at any particular pressure in response to gas flow through the main, is a function of the pressure differential in the spaces 152 and 146 and the differences in area of the diaphragms 124 and 122. The manner in which the slope of this curve is modified by the spring 154 is shown by dotted line 2 (said spring in this case having no pre-load at zero flow). The dotted line 3 indicates how the line 2 can in effect be depressed so that it lies partly below the basic pressure line b by pre-loading the spring 154 or in other words how the effect of the apparatus in modifying the control of the pilot governor in accordance with demand can be deferred until a pre-determined minimum rate of flow, that is to say until the point is reached where the dotted line 3 crosses the basic pressure line b. Until that point is reached the pilot governor is controlled solely in accordance with outlet pressure.

Various other modifications may be made without departing from the scope of the invention. For example, in each of the examples illustrated it is not essential that the conduit 54 should be connected into the main governor valve 10 to communicate with the space 58; a required pressure differential could obviously be obtained by connecting the conduits 48 and 54 into the gas main 50 on opposite sides of an orifice plate, but this would not be as convenient and would introduce a pressure loss. It will also be understood that where a number of regulators are used in parallel at a single station, to come into operation in sequence according to the demand for gas, each one can be fitted with a self loading pressure controller as described above. If the first worker is connected to gas load all the regulators and the basic loads can be set to operate in sequence.

To save undue complication the illustrations given are directed particularly to low or medium pressure conditions. The same principles can however be applied to known designs of high pressure governors.

What I claim and desire to secure by Letters Patent is:

1. Gas supply pressure control apparatus including a pilot governor valve for controlling a main governor valve at the upstream end of a gas main, a load limiting regulator associated with said pilot governor for limiting the maximum gas pressure dictated by demand, and a volumetric regulator and a needle valve for adjusting the basic supply pressure at low rates of flow, the pilot governor valve having a primary controlling diaphragm which can be acted upon by gas pressure at the upstream end of the gas main, to be responsive to changes of such pressure, and having a secondary controlling diaphragm, of pre-determinedly smaller effective area than said primary diaphragm, which can be acted upon by a pressure of gas varying according to the rate of flow of gas along the gas main, whereby the actuation of said pilot governor valve in response to pressure changes at the upstream end of said gas main is modified in accordance with the demand for gas so that an increase in pressure dictated by demand will substantially equal pressure loss due to gas flow along the main.

2. Gas supply pressure control apparatus according to claim 1, in which the secondary controlling diaphragm of the pilot governor valve is connected to the valve member of the valve through a spring, and in which a further spring is provided to act against said diaphragm so that only a proportion of the gas pressure acting against said secondary controlling diaphragm acts against the valve member, depending on the force of said further spring.

3. Gas supply pressure control apparatus according to claim 2, in which the pilot governor valve is provided with an adjusting nut whereby the force of said further spring can be adjusted.

4. Gas supply pressure control apparatus according to claim 1, in which the pilot governor valve is provided with a limiting screw the adjustment of which is effective to limit the opening of the valve.

5. Gas supply pressure control apparatus according to claim 1, in combination with a main governor valve and a conventional auxiliary system whereby the opening and closing of the main governor valve follows the opening and closing of the pilot governor valve, and means within said pilot governor whereby it can be acted upon by gas pressure at an upstream end of the gas main to be directly responsive to changes of such pressure, and with further means whereby it can be acted upon by a pressure varying according to the rate of flow of gas along the gas main, the arrangement being such that the actuation of said pilot governor valve (and thus of said main governor valve) in response to pressure changes at the upstream end of the gas main is modified in accordance with the demand for gas so that an increase in pressure dictated by a demand will substantially equal pressure loss due to gas flow along the main.

* * * * *